United States Patent
Tompkins (10) Patent No.: US 8,621,069 B1
(45) Date of Patent: Dec. 31, 2013

(54) PROVISIONING A COMPUTING APPLICATION EXECUTING ON A CLOUD TO A CLIENT DEVICE

(75) Inventor: David Tompkins, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 545 days.

(21) Appl. No.: 12/875,634

(22) Filed: Sep. 3, 2010

(51) Int. Cl.
*G06F 15/173* (2006.01)

(52) U.S. Cl.
USPC .................................. 709/224; 709/223

(58) Field of Classification Search
USPC .................................. 709/224, 223
See application file for complete search history.

(56) References Cited

U.S. PATENT DOCUMENTS

| | | | |
|---|---|---|---|
| 7,565,656 B2 * | 7/2009 | Yamasaki et al. | 718/104 |
| 7,747,698 B2 * | 6/2010 | Kovachka-Dimitrova et al. | 709/218 |
| 7,814,491 B1 * | 10/2010 | Chen et al. | 718/104 |
| 8,219,987 B1 * | 7/2012 | Vlaovic et al. | 718/1 |
| 2002/0038301 A1 | 3/2002 | Aridor et al. | |
| 2003/0084018 A1 * | 5/2003 | Chintalapati et al. | 707/1 |
| 2005/0060722 A1 * | 3/2005 | Rochette et al. | 719/319 |
| 2005/0131982 A1 * | 6/2005 | Yamasaki et al. | 709/200 |
| 2006/0041662 A1 * | 2/2006 | Georgiev et al. | 709/226 |
| 2006/0277537 A1 * | 12/2006 | Chan et al. | 717/168 |
| 2007/0201454 A1 * | 8/2007 | Weir et al. | 370/356 |
| 2007/0255798 A1 * | 11/2007 | Schneider | 709/217 |
| 2008/0253542 A1 * | 10/2008 | Lee | 379/201.03 |
| 2009/0217260 A1 * | 8/2009 | Gebhart et al. | 717/174 |
| 2009/0245248 A1 * | 10/2009 | Arberg et al. | 370/390 |
| 2010/0262752 A1 * | 10/2010 | Davis et al. | 711/103 |
| 2011/0093847 A1 | 4/2011 | Shah | |
| 2011/0191821 A1 * | 8/2011 | Pinsky et al. | 726/3 |
| 2011/0265164 A1 * | 10/2011 | Lucovsky et al. | 726/7 |

OTHER PUBLICATIONS

"U.S. Appl. No. 12/875,652, Examiner Interview Summary mailed May 2, 2013", 3 pgs.
"U.S. Appl. No. 12/875,652, Non Final Office Action mailed Jan. 31, 2013", 9 pgs.
Chun, et al., "Augmented Smartphone Applications Through Clone Cloud Execution", Intel Research Berkely, HotOS, (2009), 5 pgs.
"U.S. Appl. No. 12/875,652, Final Office Action mailed Jun. 21, 2013", 10 pgs.
"U.S. Appl. No. 12/875,652, Response filed Jun. 10, 2013 to Non Final Office Action mailed Jan. 31, 2013", 9 pgs.
"U.S. Appl. No. 12/875,652, Response filed Sep. 9, 2013 to Final Office Action mailed Jun. 21, 2013", 10 pgs.

\* cited by examiner

*Primary Examiner* — Waseem Ashraf
(74) *Attorney, Agent, or Firm* — Schwegman Lundberg Woessner P.A.

(57) ABSTRACT

A system is described to provision a computing application deployed on a cloud to a client device. In one embodiment, the system comprises a launch request detector and a provisioning module. The launch request detector may be configured to detect, at a server computer, a request from a client device to launch a computing application. The provisioning module may be configured to provision an application container from a plurality of application containers provided on a virtual instance of a machine for executing the computing application. The client device may be a desktop device or a client device.

16 Claims, 7 Drawing Sheets

PROVISIONING A COMPUTING APPLICATION EXECUTING ON A CLOUD TO A CLIENT DEVICE

TECHNICAL FIELD

This disclosure relates generally to the technical fields of software and/or hardware technology and, in one example embodiment, to system and method to provision a computing application deployed on a cloud to a client device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud.

A cloud computing approach may be used to implement a variety of computational paradigms, such as virtual machines, jobs, remote procedure calls, traditional servers, etc. A computing application executing on a virtual instance of a machine running within a public virtualization space, such as, e.g., the virtualization space provided by Amazon Elastic Compute Cloud (EC2) service, may be referred to as running on a cloud.

The proliferation of mobile devices—including super smart phones, netbooks, and tablets—presents new challenges for software development. These devices have limited screen size, limited processing and memory resources, as well as limited power.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Computationally expensive computing applications (also referred to as merely applications) may be very sensitive to processing, power, and memory constraints of mobile devices, given that most mobile devices employ central processing unit (CPU) throttling in order to conserve power and increase battery longevity. A method and system are provided that utilize cloud-based resources to operate even computationally expensive applications on mobile devices. In one embodiment, a computing application executes on dynamically scalable cloud infrastructure while streaming an application interface to one or more client devices. The interface may be bidirectional, involving the collection of interactive click and gesture streams from client devices while maintaining real-time synchronization with the streaming interface. Multiple client devices may be permitted to concurrently view the application executing on a cloud and operate within a shared and synchronized environment. A small footprint native application may be provided on the client device and function as an application interface viewer. The streaming application interface protocol may include video, audio, and a signaling channel, and may be optimized to minimize power consumption on the client device.

Method and system are described where, for each client device requesting an application, a separate instance of the requested application is started on a virtual instance of a machine (also referred to as a virtual instance or simply an instance) within a protected environment so that there's no interaction with other applications that might be running on the same virtual instance. Such protected environment, termed an application container, may be viewed as a constrained amount of CPU power, memory, and disc space that can be applied to an application that runs within a system. In one example embodiment, this is achieved by configuring a virtual instance to host an application containers manager that partitions resources of the instance into application containers. When a client device requests to launch an application, a control server operating at the application provider's site provisions an application container for executing the application on a cloud. The provisioning of an application container comprises either discovering an unused application container on one of the existing virtual instances or starting a new virtual instance that hosts an application containers manager that, upon starting, creates a plurality of application containers on the instance.

As mentioned above, one of the challenges associated with some client devices (mobile devices, for example) is that a client device may not have enough power to execute computationally expensive applications or tasks. In order to allow users to access various computationally expensive applications on their mobile devices, it may be desirable to minimize power consumption on the device by selectively delegating at least some of the application processing to a cloud, where CPU cycles are very cheap while there is certain network (or latency) cost to access those CPU cycles. In one embodiment, a technique is provided for blending the consumption of CPU cycles across the client device and a virtual instance executing on a cloud in a way that is optimal for the particular application. A control server operating at the application provider's site may be configured to include a work distribution module that processes power consumption parameters' values of the client device, networking and latency costs of executing various portions of the application off the device, and generates a work distribution model for the computing application.

The work distribution model is provided to the application executing on a virtual instance. The work distribution model is used by the application to guide it in determining which portions of the application are to be executed on the instance and which portions are to be executed on the client device. A work distribution model may be aimed at providing a user with the best application experience on the client device while allowing the device the maximum longevity and battery power that it can have. The work distribution model may be dynamically adjusted for a particular application based on the status of the instance and fluctuations in bandwidth and latency associated with the executing of the application.

Example computing applications that may be provided to user of client devices (e.g., mobile devices) utilizing the methods and systems described wherein include Adobe® Acrobat® and Flash® applications offered by Adobe Systems Incorporated, as well as multi-player online gaming applications and general collaboration use cases for enterprise applications on mobile devices. While embodiments of the hosted service system are described with reference to Amazon EC2 service, other virtualization services may be utilized.

Figure 1:
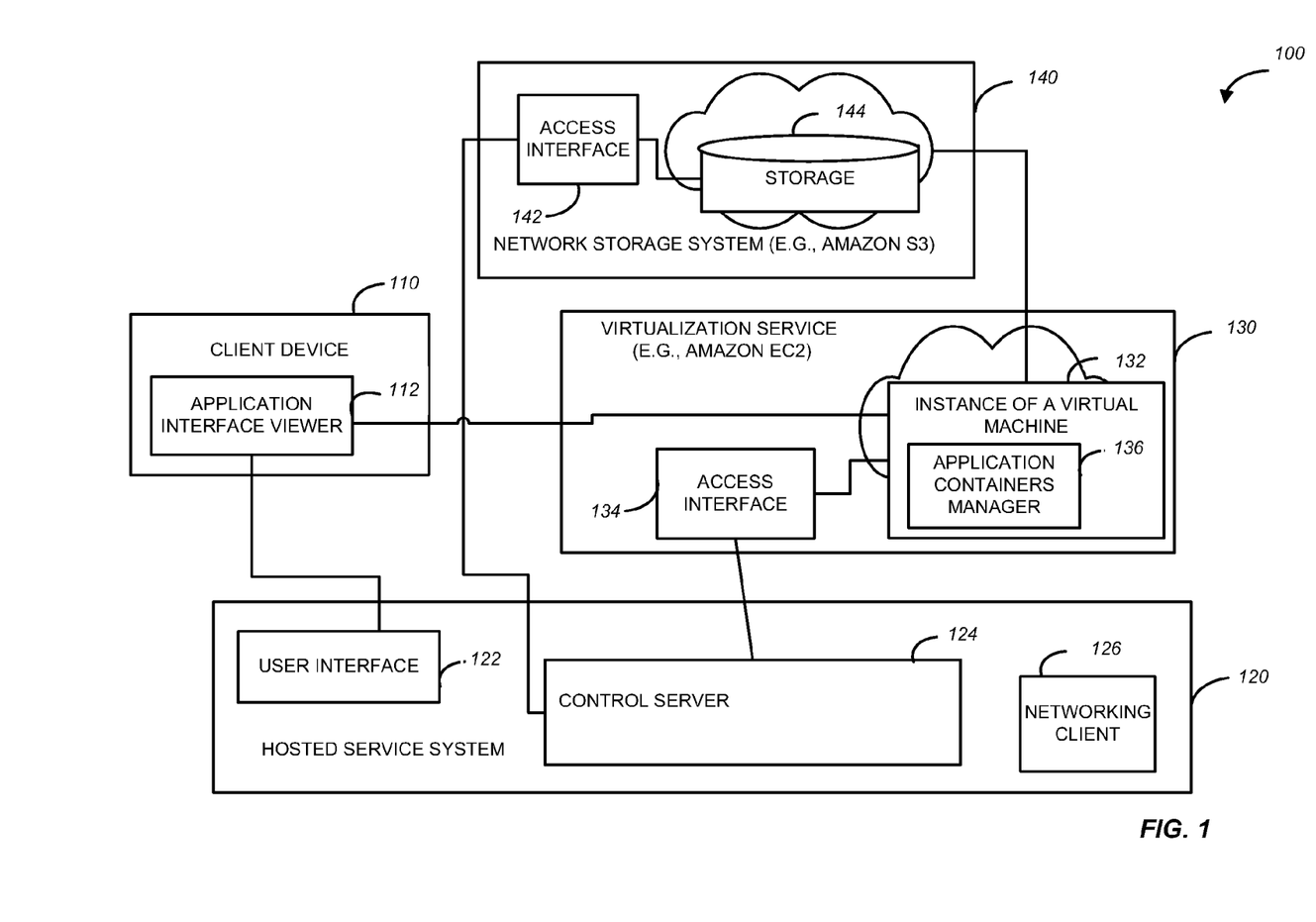
FIG. 1 is a block diagram showing an architecture within which a method and system to provision a computing application deployed as a cloud to a client device may be implemented, in accordance with an example embodiment.

An example architecture, within which method and system to provision a computing application executing on a cloud to a client device may be implemented, is described with reference to an architecture diagram illustrated in FIG. 1. Architecture 100 shown in FIG. 1 may include a client device 110 and a hosted service system 120. In one example embodiment, the hosted service system 120 is to provision and manage computing applications utilizing a cloud-based computing service as a virtualization infrastructure. Cloud-based computing services are shown in FIG. 1 as a virtualization service 130 and a network storage service 140. In one embodiment, a hosted service system 120 utilizes Amazon EC2 as a virtualization service and Amazon Simple Storage Service (Amazon S3) as a network storage service. The client device 110 and the hosted service system 120 may be in communication with each other via a communications network that may be a public network (e.g., the Internet).

The virtualization service 130 may load onto a cloud an instance of a virtual machine 132 that hosts an application server termed an application containers manager 136 utilizing a machine image stored by the network storage service 140. A machine image is a read-only boot image that is used for launching an instance of a virtual machine running an application containers manager. A machine image representing a machine executing an application containers manager may be provided to a network storage system (e.g., Amazon S3) by a control server 224 (also referred to as a controller).

The instance of a virtual machine 132 may be accessible by the client device 110 via an application interface viewer 112. The application interface viewer 112, in one embodiment, is a client application native to the client device 110. As mentioned above, a user in control of the client device 110 may send a request to the hosted service system 120 to launch the computing application. The request may be initiated via a user interface 122 provided by the hosted service system 120 to the client device 110 via the application interface viewer 112.

The user interface 122, in one embodiment, provides both an end-user's and a system administrator's view of the instance of a virtual machine 132 and also permits issuing control operations to the instance of a virtual machine 132 and permits viewing the resulting changes in the state of the instance of a virtual machine 132. The user interface 122 may also serve as a source of information for the hosted service system 120, including documentation, downloads, and support. The user interface 122, in one embodiment, uses Adobe® Flex® software, offered by Adobe Systems Incorporated, as the user interface technology for the implementation of the user interface. The user interface 122, in one embodiment, uses an XML (Extensible Markup Language)-based representational state transfer (REST) style secure communications protocol to synchronize its operations with a control server 124. A request to access the user interface 122 may be authenticated using one of a variety of authentication techniques.

The request from the client device 110 to launch the computing application is received at the control server 124, which responds to the request by activating an access interface 134 provided by the virtualization service 130 and performs actions to provision an application container for executing the requested computing application within the virtualization service 130. As mentioned above, an application container for executing the requested computing application may be provisioned by either discovering an unused application container on an existing virtual instance or by starting a new virtual instance hosting the application containers manager 136.

The control server 124, in one example embodiment, provides coordination between the components of the architecture 100, provides administration and monitoring of the virtualization service 130, and also may be configured to audit system usage and resource allocation with respect to the instance of a virtual machine 132. The control server 124 includes a database to store information pertaining to various aspects of system usage. For example, every new virtual instance is registered in the database, and its parameters, including availability of one or more application containers is recorded in the database. Also registered in the database are client devices that host respective application interface viewers and are permitted to request the launching of the application. The control server 124, in one embodiment, runs within a standard Hypertext Transfer Protocol Secure (HTTPS)-compliant web server and may be deployed as a publically accessible web application that is available outside a firewall. The control server 124, in one embodiment, is implemented using Ruby on Rails™ technology.

The virtualization service 130 accesses the storage 144 of the network storage system 140 to obtain machine images in order to load the associated instance of a virtual machine 132. The machine images can be uploaded to the network storage system by the control server 124 utilizing an access interface 142 provided with the network storage system 140. The storage 144 may also store an application image that is accessed and used by the application containers manager 136 to launch an application requested by the client device 110 within an application container provided by the application containers manager 136 on the instance 132.

The hosted service system 120 further includes a secure networking client 126 to provide a bidirectional, encrypted, compressed connection between a machine in the end-user's secure network environment (e.g., the client device 110) and the instance of a virtual machine 132. The networking client 126 manages various aspects of transmission control protocol (TCP) traffic forwarding, encryption, and network discovery, such that the user can access the instance of a virtual machine 132 as if it was running locally on the user's machine. In this mode, the user's network security envelope is extended to surround the instance of a virtual machine 132 using comparable levels of encryption and protection against network security threats.

Figure 2:
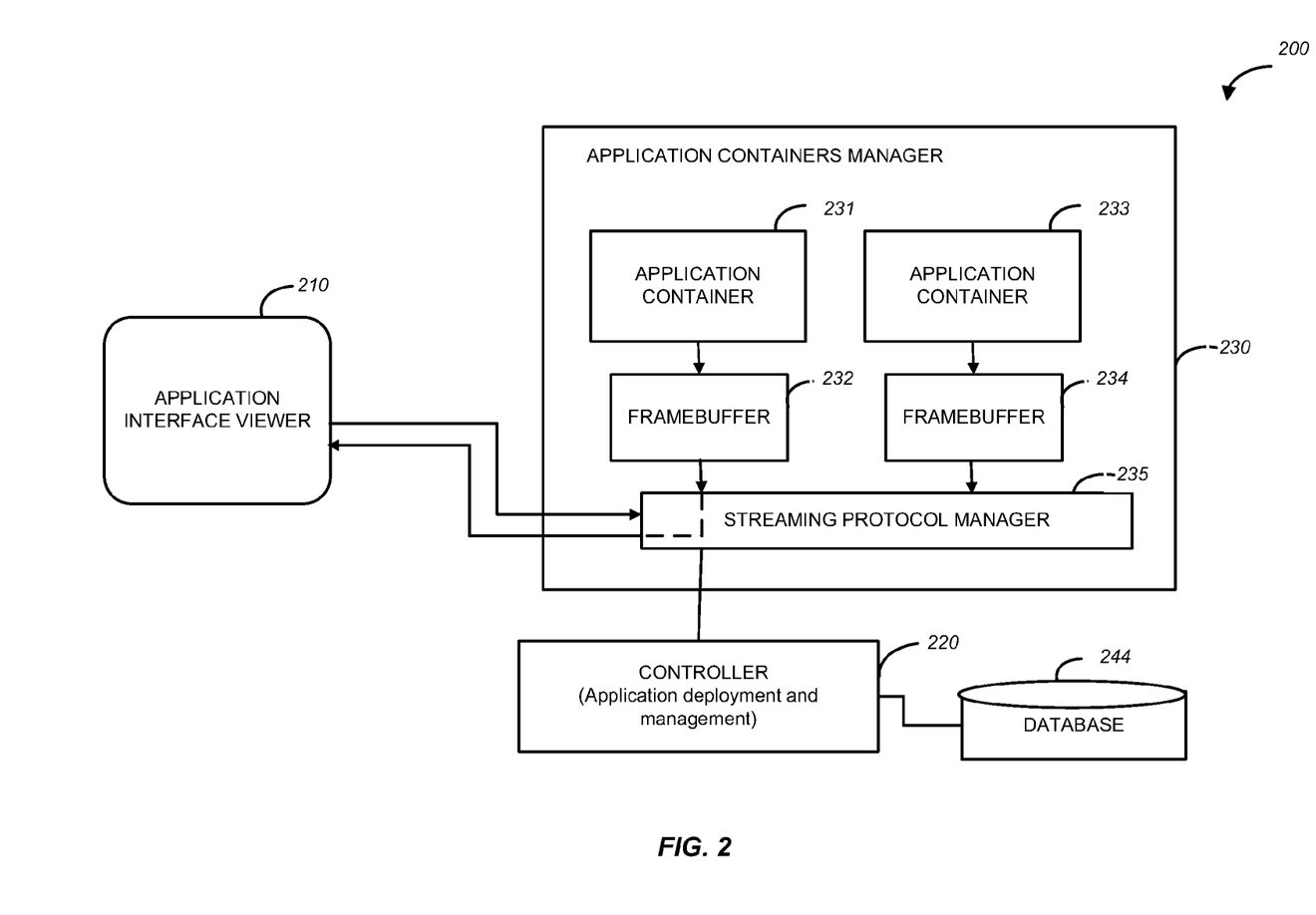
FIG. 2 is a diagrammatic representation illustrating interaction between a client device, an application container manager, and a controller, in accordance with an example embodiment.

FIG. 2 is a diagrammatic representation 200 illustrating interaction between a client device, an application container manager, and a controller, in accordance with an example embodiment. Sown in FIG. 2 is an application containers manager 230 (that may be running on the instance 132 of FIG. 1), an application interface viewer 210 (that may be running on the client device 110 of FIG. 1), and a controller 220 (that may correspond to the control server 124 of FIG. 1) in communication with a database 244. The database 244 may be configured to store registration information for every new virtual instance and every client device that hosts an application interface viewer and is permitted to request the launching of the application. The application containers manager 230, as shown in FIG. 2, is hosting application containers 231 and 233, each running a separate instance of a computing application. Not shown is an unused application container that would be available to start another instance of the application in response to a request from another client device. The application containers 231 and 233 also provide respective virtual device frame buffers 232 and 234 so that if the application writes into its respective virtual frame buffer as a display, that display will then be sent to the application interface viewer 210 running on the client device 110. As shown in FIG. 2, data from the frame buffer 232 is being streamed to the application interface viewer 210.

The application interface viewer 210 is a native client application installed on the client device 110, configured to display the application stream received from the application running on a virtual instance and to return control events (e.g., clicks and gestures) to the application running on the virtual instance, via the streaming protocol manager 135.

The architecture 200 illustrated in FIG. 2 may be utilized to run any application, even one designed to run on a desktop computer, on a mobile device. An environment created through cloud computing for the application to execute appears to a user on the mobile device just like the native environment for the application (e.g., desktop environment). The display (application interface) is streamed to the mobile device from the instance of a virtual machine on which the application executes. The display may be resized or reformatted on the fly to fit the real estate of that mobile device. Any actions that occur on the mobile device (e.g., clicks, gestures, movement) are streamed back to the application executing on the virtual instance and translated in a way so that they will make sense to the application itself. For instance, an application originally designed for executing on a desktop computer does not expect screen gestures. On a mobile device screen gestures might be the proper way to navigate the application interface and therefore a translation module may be provided on the virtual instance (e.g., as part of the streaming protocol manager 235) to perform translation between an operation on a client device and what that would mean for the application. The architecture 200 may be viewed as a coordinated system where an application can be started, provided to one or more client devices, and stopped when no longer desired by a user.

Figure 3:
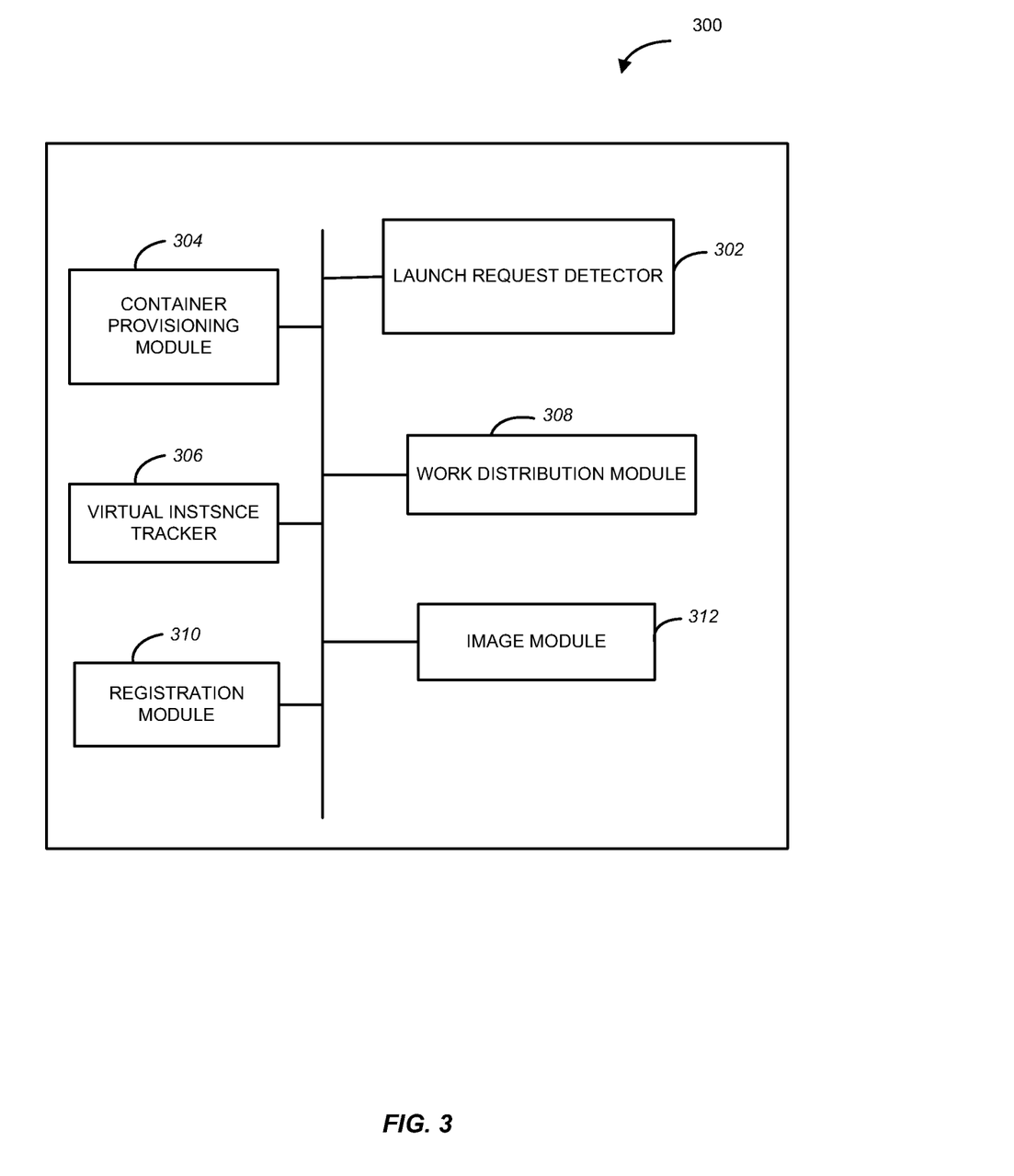
FIG. 3 is a block diagram illustrating some components of a control server, in accordance with an example embodiment.

FIG. 3 is a block diagram of a system 300 illustrating some components of a control server, in accordance with an example embodiment. As shown in FIG. 3, the system 300 comprises a launch request detector 302 and a provisioning module 304. The launch request detector 302 may be configured to detect, at the control server 124 of FIG. 1, a request from the client device 110 of FIG. 1 to launch a computing application. The provisioning module 304 may be configured to provision an application container from a plurality of application containers provided on a virtual instance of a machine for executing the computing application. The provisioning module 304 obtains tracking information from a virtual instance tracker 306. As mentioned above, the control server 124 registers, using a registration module 310, every new virtual instance of a machine that runs an application containers manager and also tracks the status and resources availability of the virtual instances. The virtual instance tracker 306 provides the provisioning module 304 with tracking information indicating whether an application container is available within an existing virtual instance for executing the requested application or whether a new virtual instance is to be launched in order to provision an application container for executing the requested application.

The system 300 may also include a work distribution module 308 and an image module 312. The image module 112 may be configured to store machine images and application images at a network storage system 140 of FIG. 1. The image module may thus store, at the network storage system 140, a machine image comprising an application containers manager and an image of the computing application, the image of the computing application to be used for launching the requested computing application within the application container. The modules illustrated in FIG. 3 may be implemented as software, hardware, or a combination of both. Various operations performed by the system 300, according to an example embodiment, are discussed with reference to FIG. 4.

Figure 4:
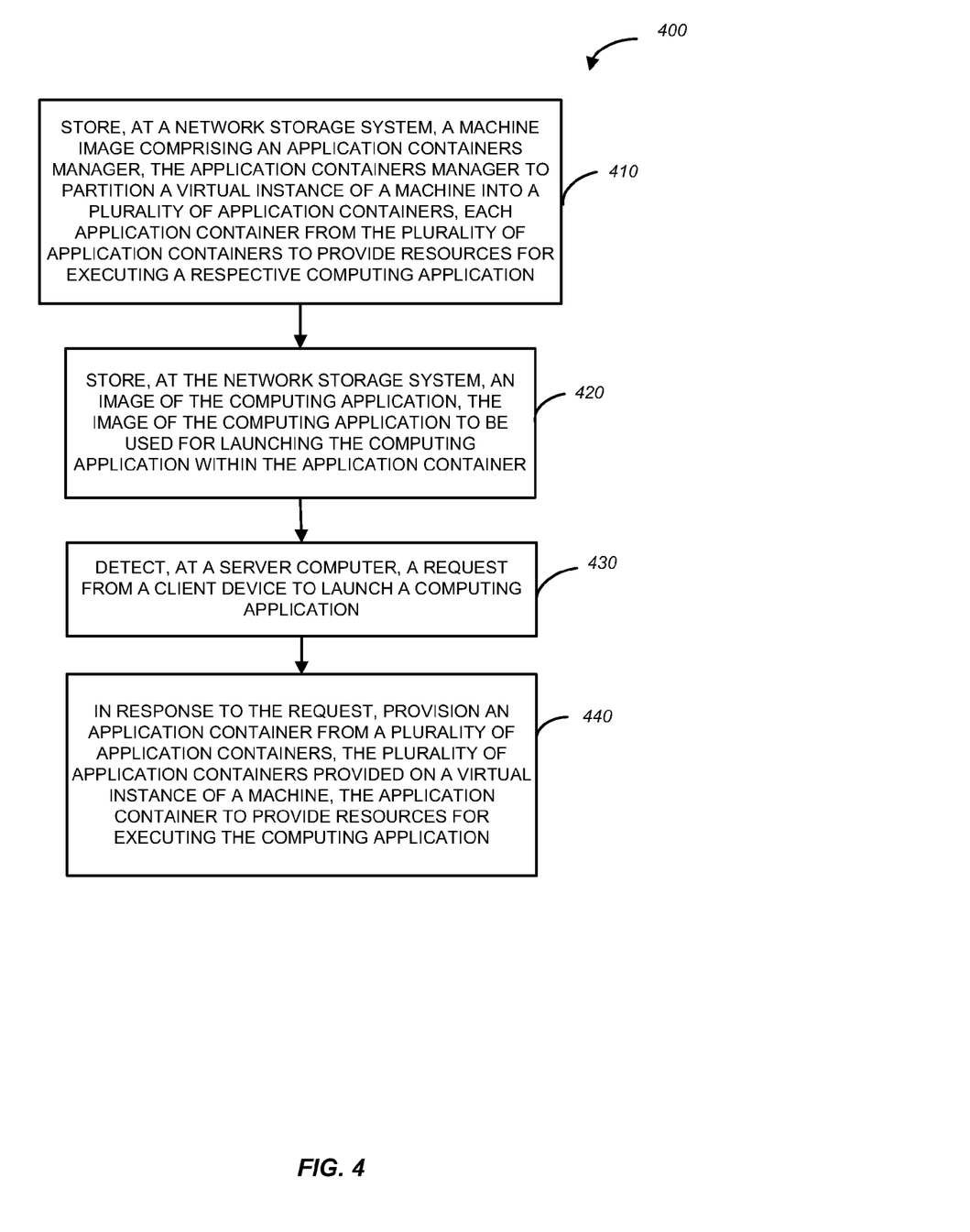
FIG. 4 is a flow chart illustrating a method to provision an application container for executing a requested application on a cloud, in accordance with an example embodiment.

FIG. 4 is a flow chart illustrating a method to provision an application container for executing a requested application on a cloud, in accordance with an example embodiment. The method 400 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 3.

As shown in FIG. 4, the method 400 commences with operations 410 and 420, where a machine image a machine image comprising an application containers manager and an application image are stored at the network storage system 140. At operation 430, the control server 124 of FIG. 1 detects 124 of FIG. 1 a request from the client device 110 of FIG. 1 to launch a computing application. At operation 440, the control server 124 provisions an application container on a virtual instance of a machine, the application container to provide resources for executing the computing application. As mentioned above, the control server 124 provisions an application container either by discovering an available application container at an existing virtual instance or by launching a new virtual instance that hosts an application containers manager.

Figure 5:
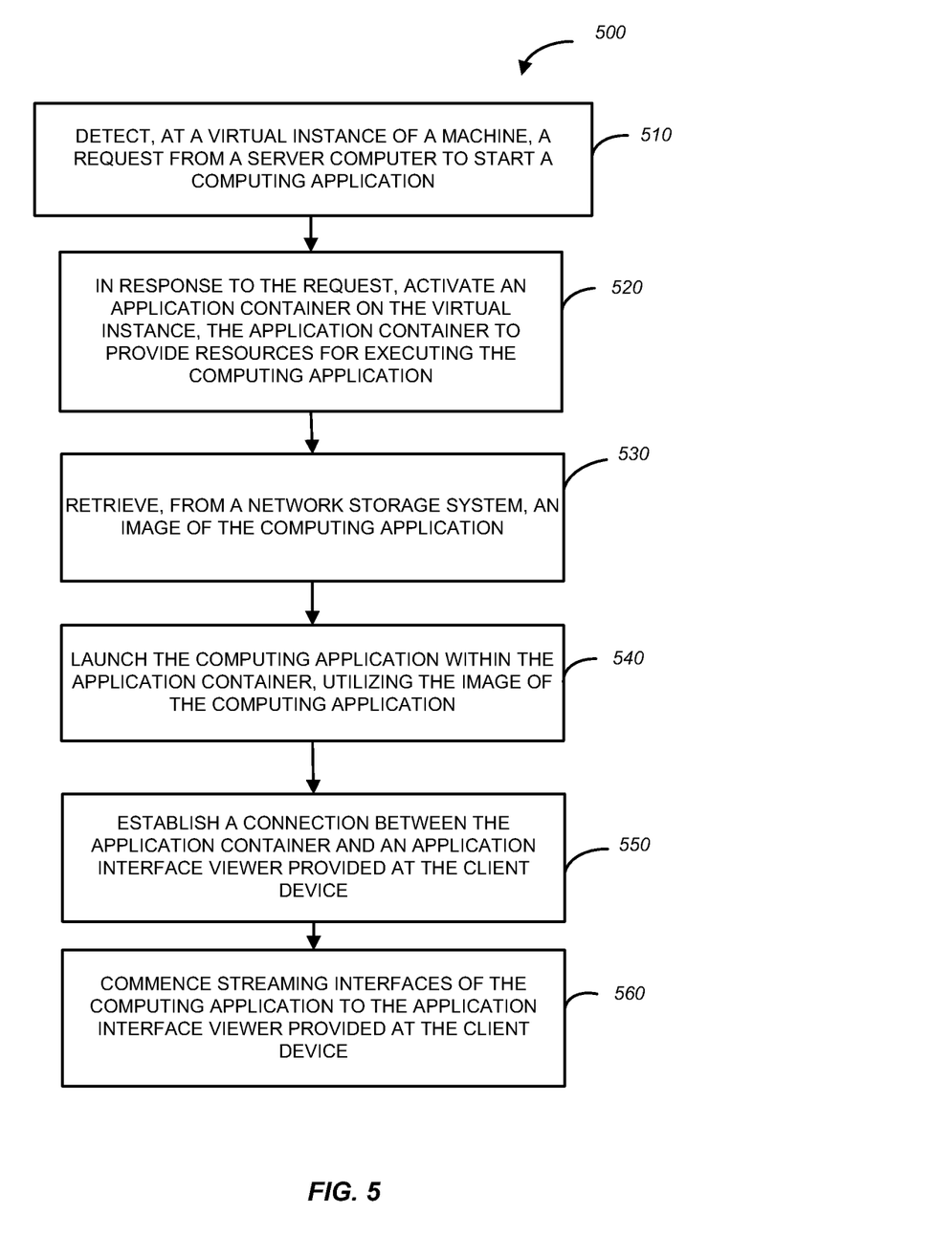
FIG. 5 is a flow chart illustrating a method to launch a requested application in an application container provided on a cloud, in accordance with an example embodiment.

FIG. 5 is a flow chart illustrating a method 400 to launch a requested application in an application container provided on a cloud, in accordance with an example embodiment. The method 500 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 3.

As shown in FIG. 5, the method 500 commences with operation 510, where a request from the server computer to start a computing application is detected at a virtual instance of a machine (e.g., are quest from the control server 124 of FIG. 1 to start, on the virtual instance 132 of FIG. 1, a computing application requested by the client device 110 of FIG. 1). At operation 520, in response to the request, an application container provided by the application containers manager 136 of FIG. 1 is activated on the virtual instance 132. As explained above, the application container is to provide resources for executing the requested computing application. At operation 530, an image of the requested computing is retrieved from the network storage system 140 of FIG. 1. At operation 540, the activated application container launches the computing application within the application container, utilizing the retrieved image of the computing application. At operation 550, a connection is established between the application container and the application interface viewer provided at the client device 110. The streaming of the interfaces of the computing application to the application interface viewer provided at the client device is commenced at operation 560.

Figure 6:
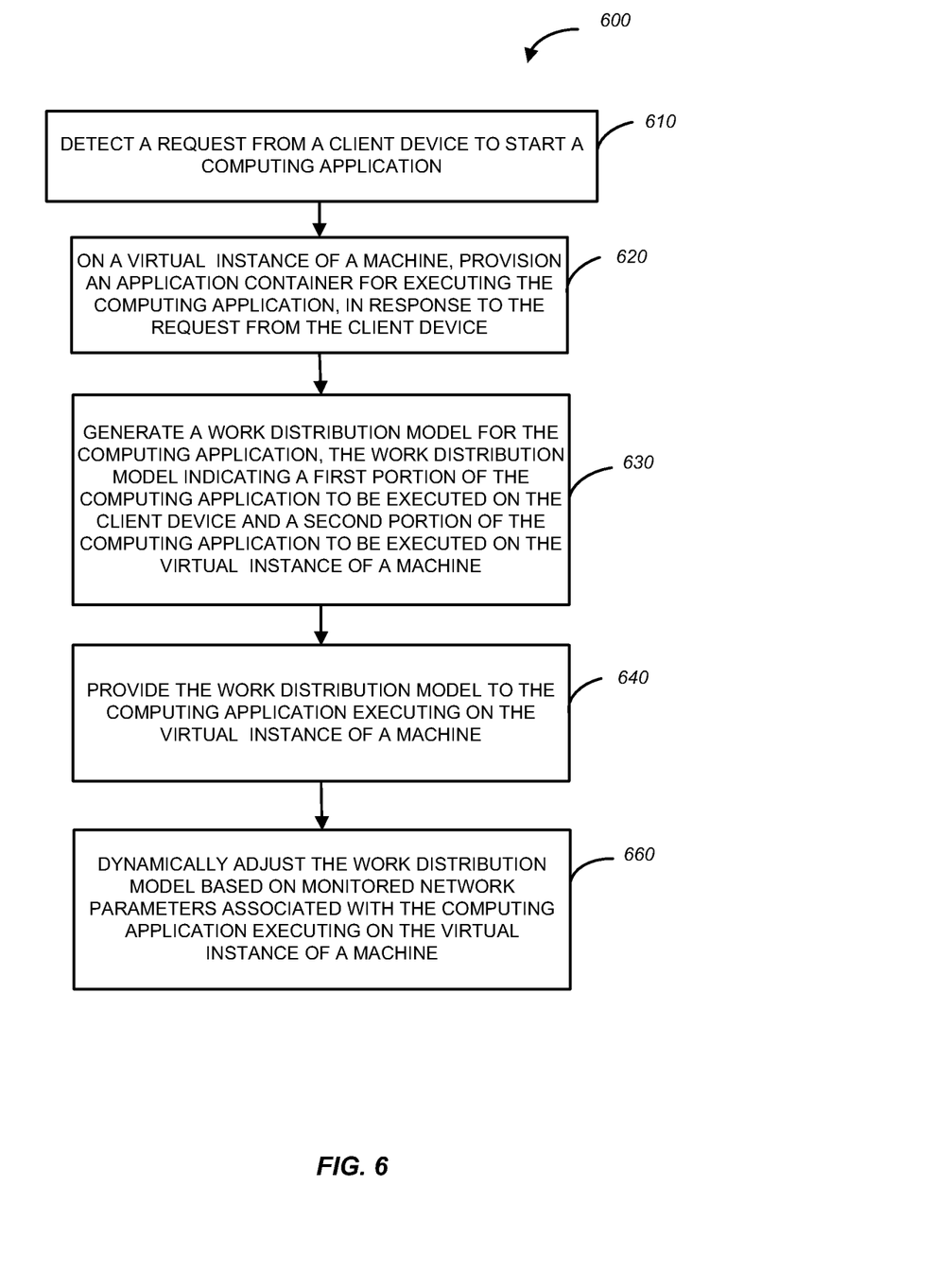
FIG. 6 is a flow chart illustrating a method to determine a work distribution model for a computing application provided on a cloud for access by a client device, in accordance with an example embodiment.

FIG. 6 is a flow chart illustrating a method 600 to determine a work distribution model for a computing application provided on a cloud for access by a client device, in accordance with an example embodiment. The method 600 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 3.

As shown in FIG. 6, the method 600 commences with operation 610, where the launch request detector 302 of FIG. 3 detects a request from a client device to start a computing application. The container provisioning module 304 of FIG. 3 provisions, on a virtual instance of a machine, an application container for executing the requested computing application, in response to the request from the client device. After the requested application is started on the virtual instance, in the application container, the work distribution module 308 of FIG. 3 generates work distribution model indicating which portion of the computing application (if any) is to be executed on the client device and which portion of the computing application is to be executed on the virtual instance of a machine.

As discussed above, a client device that is a mobile device is typically configured to maximize the battery life of the device, and for some applications it may be advantageous to perform nearly all computational operations associated with the execution of an application on a cloud and not on the mobile device. For some applications, however, such as, e.g., interactive game applications, the latency associated with transmitting data between the mobile device and the cloud in order to perform operations on the transmitted data may be prohibitive. For example, a user may wish to edit a video file of 50 megabytes using the computing application. In order to make a change to the file and perform the change not on the mobile device but on the cloud, the mobile device would be required to send 50 megabytes to the virtual instance running the application and then get it back over wireless routes, which might take 30 seconds or a minute to occur. Thus, for some application it may be advantageous to execute some portions of the application on the cloud and some portions on the device itself. The work distribution module 308 utilizes various information (such as the cost of client device CPU cycle, application utilization of the CPU cycles, available bandwidth for communications between the client device and the virtual instance, latency constraints provided for the application, etc.) in order to determine the work distribution model for that particular client device accessing that particular computing application that is being launched on a virtual instance. These values used by the work distribution module 308 may be obtained or accessed by the control server 124.

Returning to FIG. 6, at operation 640 the work distribution model is provided to the computing application executing on the virtual instance of a machine. As mentioned above, the work distribution model may be adjusted dynamically based on monitored network parameters collected by the control server 124 with respect tot the computing application executing on the virtual instance of a machine.

Figure 7:
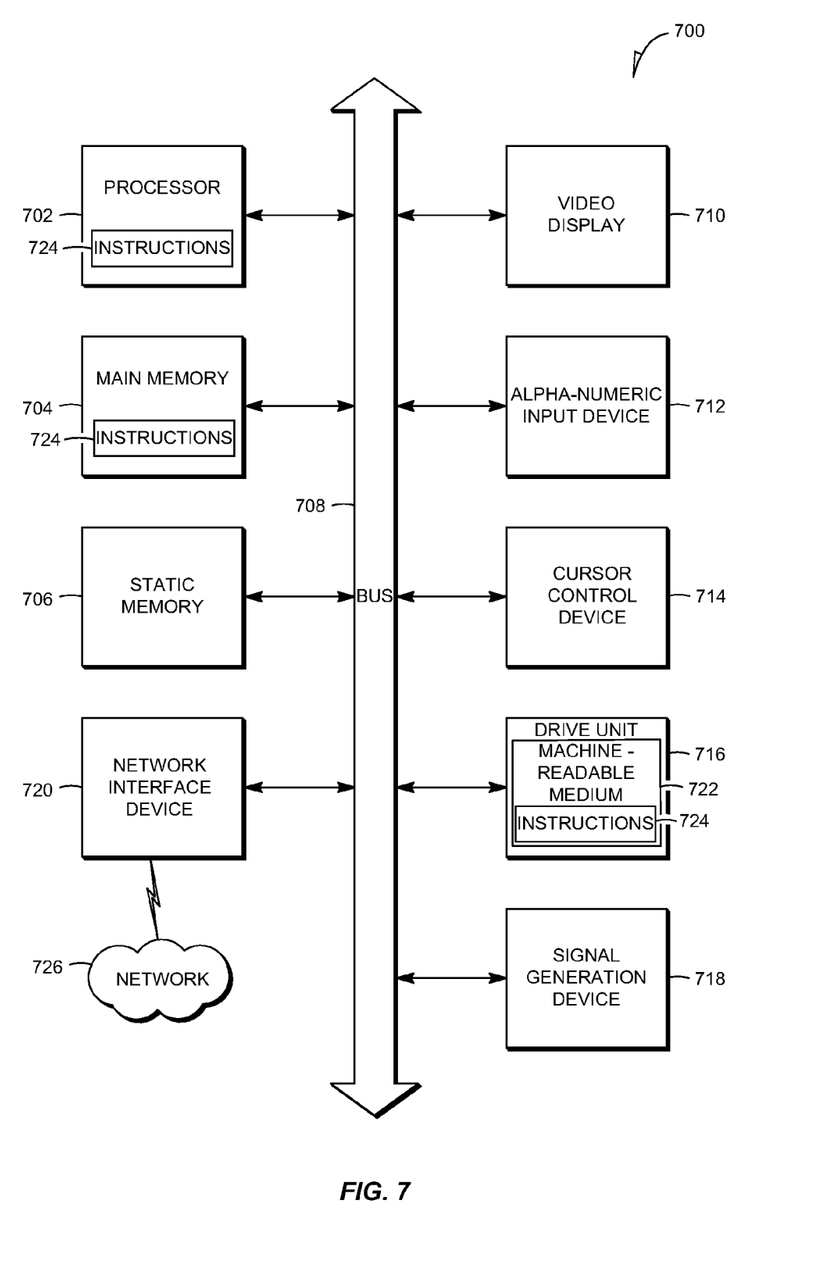
FIG. 7 is a diagrammatic representation of a machine in the example form of a computer system within which a set of instructions, for causing the machine to perform any one or more of the methodologies discussed herein, may be executed.

FIG. 7 is a diagrammatic representation of a machine in the example electronic form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) cursor control device 714 (e.g., a mouse), a disk drive unit 716, a signal generation device 718 (e.g., a speaker) and a network interface device 720.

The disk drive unit 716 includes a computer-readable (or machine-readable) medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and to provision a computing application deployed on a cloud to a client device have been described. While some example approaches described herein may be used with ADOBE® products, the techniques described herein may be utilized beneficially with various other products.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
storing, at a network storage system, a machine image comprising an application containers manager to partition a virtual instance of a machine into a plurality of application containers, the plurality of application containers to provide resources for executing a plurality of computing applications, the application containers manager including a respective frame buffer for each of the plurality of application containers for storing interfaces of each of the plurality of computing applications to be streamed to a client device;
detecting, at a server computer, a request from the client device to launch a particular computing application from the plurality of computing applications; and
in response to the request, provisioning an application container from a the plurality of application containers, the provisioned application container to provide resources for executing the particular computing application.

2. The method of claim 1, wherein the client device is a mobile device.

3. The method of claim 1, wherein the provisioning of the application container comprises determining that the virtual instance of a machine is an existing virtual instance and determining that the application container is available for launching the computing application.

4. The method of claim 1, wherein the provisioning of the application container comprises causing a virtualization service to start the virtual instance of a machine, the virtual instance of the machine to host an application containers manager, the application containers manager to provide the application container for launching the computing application.

5. The method of claim 4, wherein the application container is associated with a constrained amount of processing power, memory, and disk space that can be applied to a computing application executing on the virtual instance of a machine.

6. The method of claim 1, comprising storing, at the network storage system, an image of the computing application, the image of the computing application to be used for launching the computing application within the application container.

7. The method of claim 1, wherein the application containers manager comprises a streaming protocol manager to stream interfaces of the computing application to the client device.

8. The method of claim 1, wherein the client device hosts an application interface viewer, the application interface viewer to facilitate communications between the client device and the computing application executing in the application container on the virtual instance of the machine.

9. A computer-implemented system comprising:
a memory storing an image module, a launch request detector, and a provisioning module; and
a processor;
wherein the image module is executed by the processor to store, at a network storage system, a machine image comprising an application containers manager, the application containers manager to partition a virtual instance of a machine into a plurality of application containers, the plurality of application containers to provide resources for executing a plurality of computing applications, the application containers manager comprises a respective frame buffer for each of the plurality of application containers for storing interfaces of each of the plurality of computing applications to be streamed to the client device; wherein the launch request detector is executed by the processor to detect, at a server computer, a request from the client device to launch a particular computing application from the plurality of computing applications; and     wherein the provisioning module is executed by the processor to provision an application container from the plurality of application containers, the application container to provide resources for executing the computing application, in response to the request.

10. The system of claim 9, wherein the client device is a mobile device.

11. The system of claim 9, wherein the provisioning module is to determine that the virtual instance of a machine is an existing virtual instance and to determine that the application container is available for launching the computing application.

12. The system of claim 9, wherein the provisioning module is to cause a virtualization service to start the virtual instance of a machine, the virtual instance of the machine to host an application containers manager, the application containers manager to provide the application container for launching the computing application.

13. The system of claim 12, wherein the application container is associated with a constrained amount of processing power, memory, and disk space that can be applied to a computing application executing on the virtual instance of a machine.

14. The system of claim 9, wherein the image module is to store, at the network storage system, an image of the computing application, the image of the computing application to be used for launching the computing application within the application container.

15. The system of claim 9, wherein the application containers manager comprises a streaming protocol manager to stream interfaces of the computing application to the client device.

16. A machine-readable non-transitory storage medium having instruction data to cause a machine to:

storing, at a network storage system, a machine image comprising an application containers manager to partition a virtual instance of a machine into a plurality of application containers, the plurality of application containers to provide resources for executing a plurality of computing applications, the application containers manager including a respective frame buffer for each of the plurality of application containers for storing interfaces of each of the plurality of computing applications to be streamed to a client device;

detect, at a virtual instance of a machine, a request from the client device to start a particular computing application from the plurality of computing applications;

in response to the request, activate an application container from the plurality of application containers on the virtual instance, the application container to provide resources for executing the particular computing application;

retrieve, from a network storage system, an image of the computing application;

launch the computing application within the application container, utilizing the image of the computing application;

establish a connection between the application container and an application interface viewer provided at the client device; and commence streaming interfaces of the computing application to the application interface viewer provided at the client device.

\* \* \* \* \*